April 30, 1963   B. R. ROBERTS ETAL   3,087,468
VALVE ACTUATOR
Filed Sept. 10, 1959   5 Sheets-Sheet 1

INVENTORS:
Bob R. Roberts
and William Etter,
BY Bair, Freeman & Molinare
ATTORNEYS.

April 30, 1963
B. R. ROBERTS ETAL
3,087,468
VALVE ACTUATOR
Filed Sept. 10, 1959
5 Sheets-Sheet 2
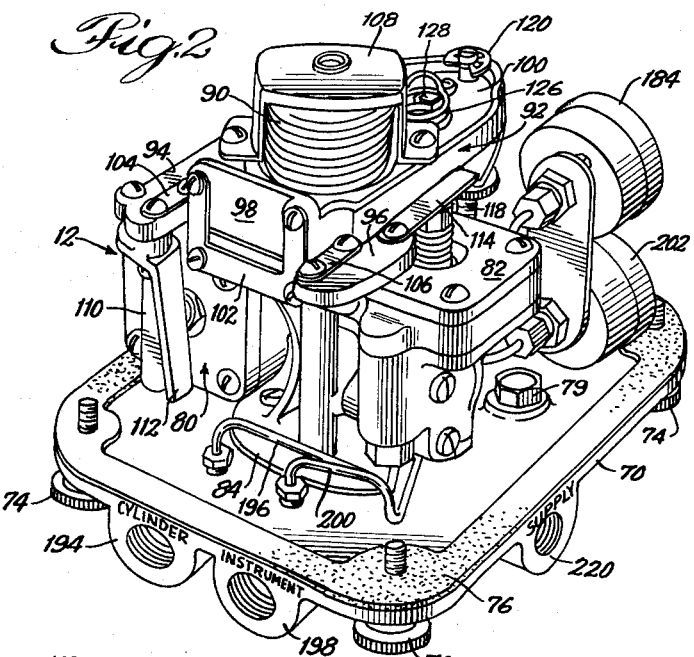
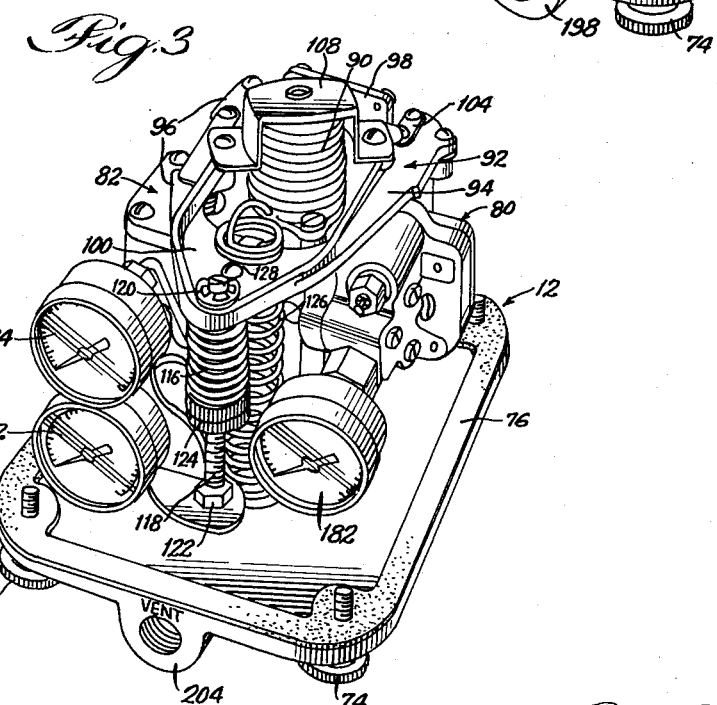
INVENTORS:
Bob R. Roberts
and William Etter,
BY Bair, Freeman & Molinare
ATTORNEYS.

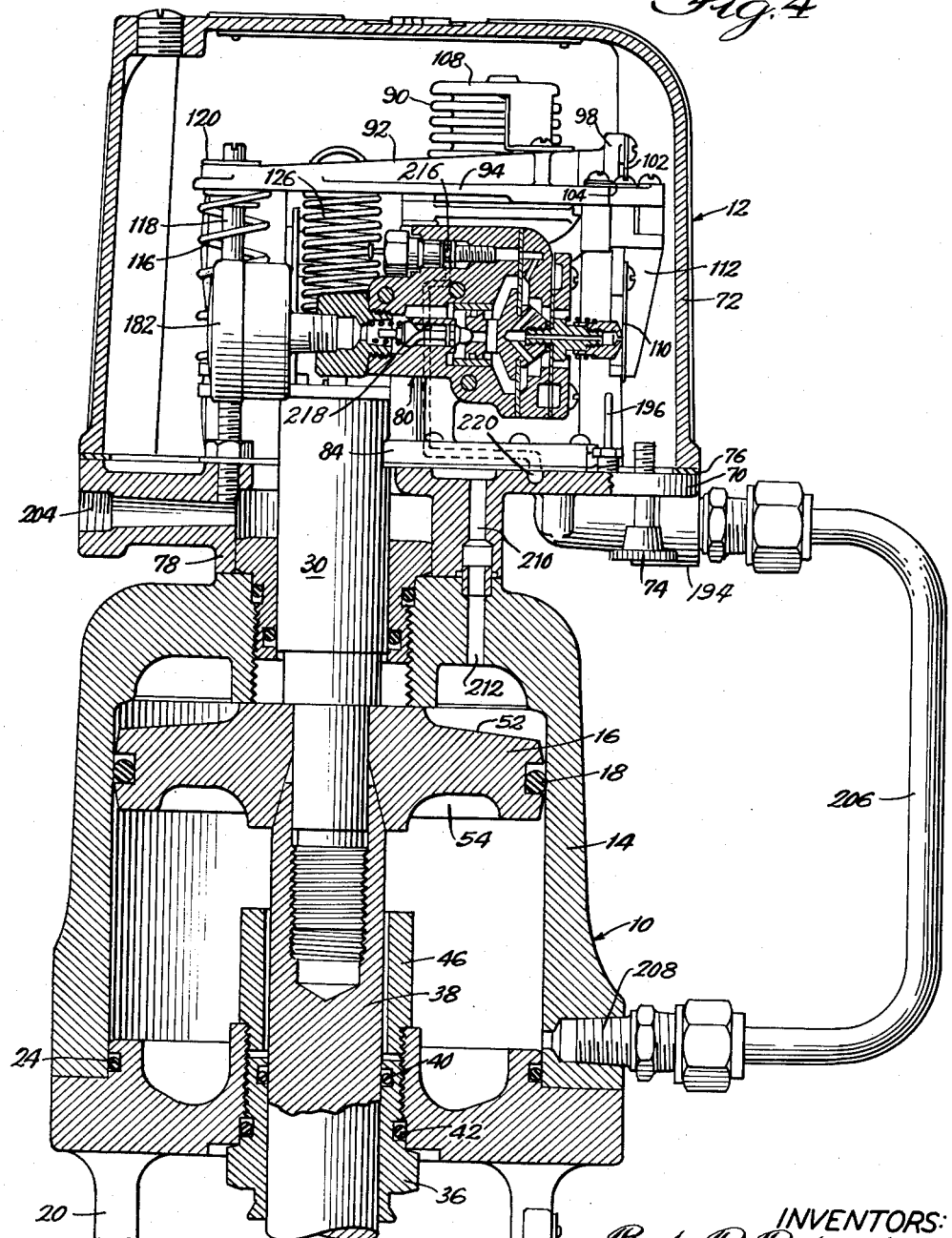

April 30, 1963 B. R. ROBERTS ETAL 3,087,468
VALVE ACTUATOR
Filed Sept. 10, 1959 5 Sheets-Sheet 4
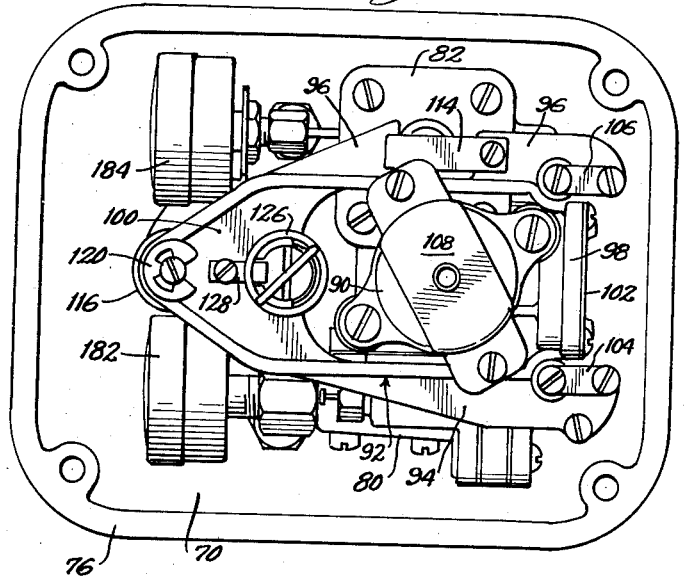
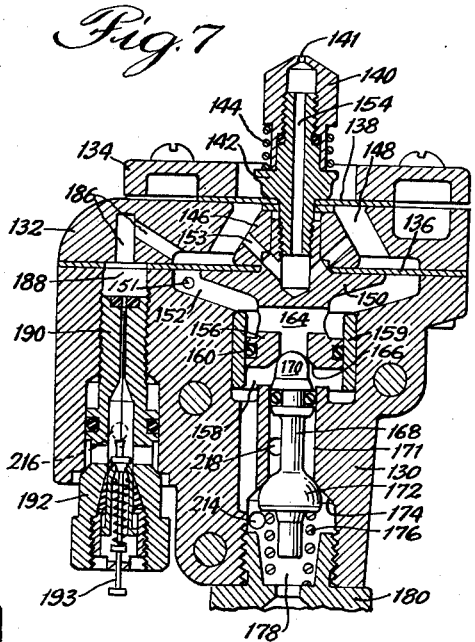
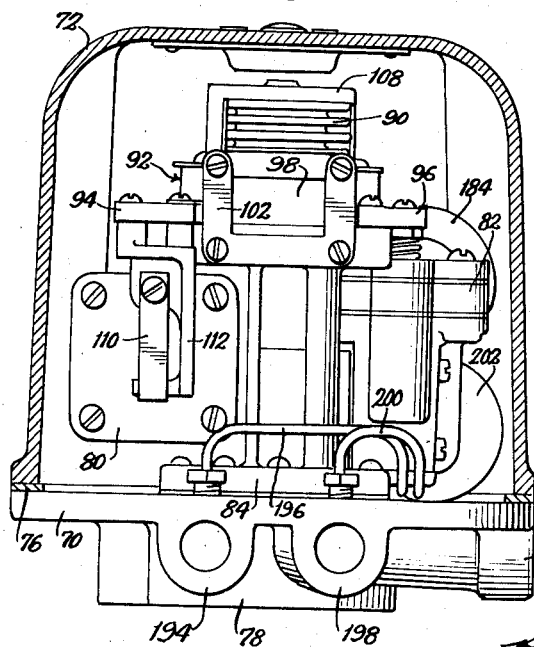
INVENTORS:
Bob R. Roberts
and William Etter,
BY Bair, Freeman & Molinare
ATTORNEYS.

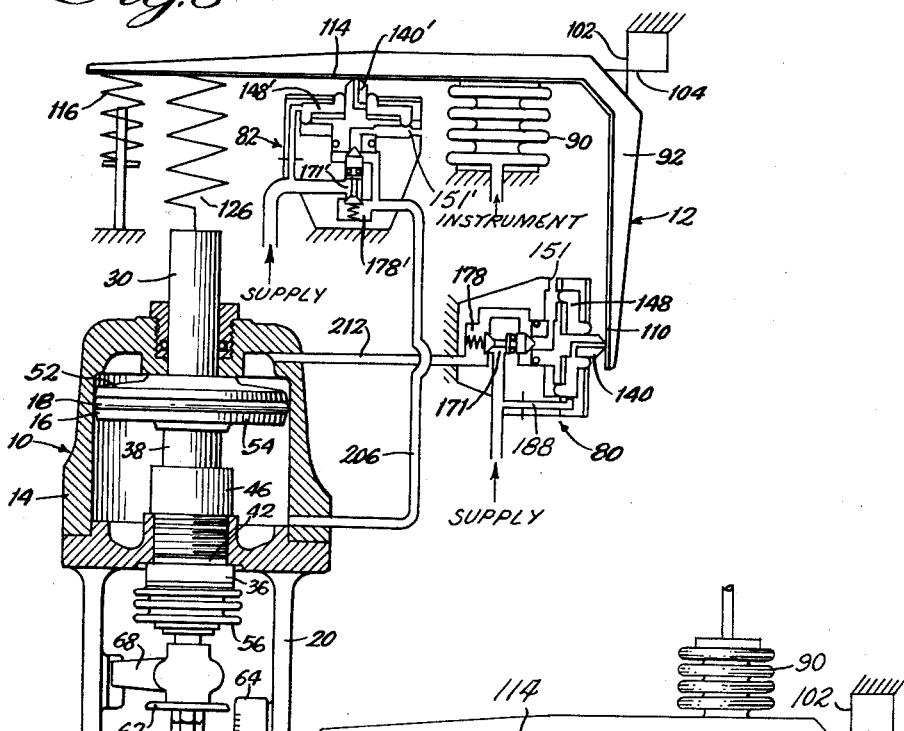
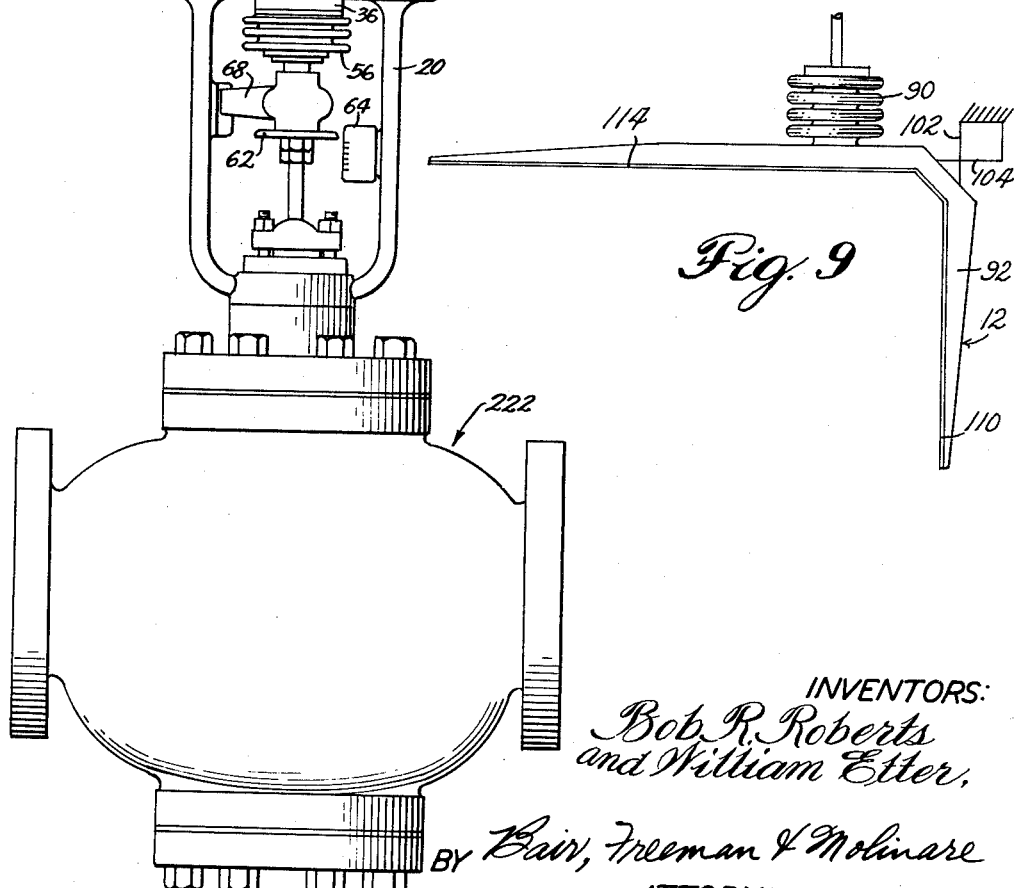

United States Patent Office 3,087,468
Patented Apr. 30, 1963

3,087,468
VALVE ACTUATOR
Bob R. Roberts and William A. Etter, Marshalltown,
Iowa, assignors to Fisher Governor Company
Filed Sept. 10, 1959, Ser. No. 839,192
3 Claims. (Cl. 121—41)

This invention relates generally to a pneumatic cylinder type actuator, and more particularly to improvements in a valve actuator of the pneumatically-operated piston type. This disclosure is a continuation-in-part of our earlier filed application for the identical invention, Serial No. 833,819, filed August 14, 1959, now abandoned.

It is the primary object of this invention to provide a novel and improved high pressure actuator adapted for applications where more force and higher stroking speeds are required than can be obtained from known diaphragm-type actuators.

It is another object of this invention to provide a novel valve actuator combination comprising actuator means of the double-acting air cylinder type, and a pneumatically-operated positioner of the push-pull type.

It is a further object of this invention to provide a novel pneumatically-operated positioner of the push-pull type comprising a pivoted beam and opposed pneumatic relays operative to respond to changes in pressure of the fluid being controlled for effecting movement of a double-acting air cylinder to control a main valve in the flow line of the fluid being controlled.

It is contemplated that the present invention will have practical applications primarily where more force and higher stroking speeds are required that can be obtained with conventional diaphragm-type valve operators. It will be understood, however, that the present invention may be utilized in all systems requiring a positive and accurate control of fluid flow. It is a still further object of the invention, therefore, to provide a high pressure actuator suitable for a wide range of instrument signals and supply pressures while achieving high stem forces and high stroking speeds.

Further objects and advantages of this invention will become apparent as the following description proceeds, and the features of novelty which characterize this invention will be pointed out with particularity in the claims annexed to and forming part of this specification.

A preferred embodiment of the invention is shown in the accompanying drawing, in which:

FIGURES 2 and 3 are perspective views, with cover removed, of the positioner means of the present invention.

FIGURE 4 is a fragmentary vertical cross sectional view of the actuator construction of FIGURE 1 on an enlarged scale to show the details of construction of the positioner means.

FIGURE 5 is a top plan view of the positioner means with cover removed.

FIGURE 6 is a vertical cross sectional view taken through the cover of the positioner means and showing the latter in end elevation.

FIGURE 7 is a fragmentary cross sectional view of one of the air relays of the positioner means.

FIGURE 8 is a more or less diagrammatic view of the high pressure actuator of the present invention in a system application.

FIGURE 9 is a diagrammatic view corresponding to FIGURE 8, illustrating an alternative mounting of the bellows of the positioner means.

Figure 1:
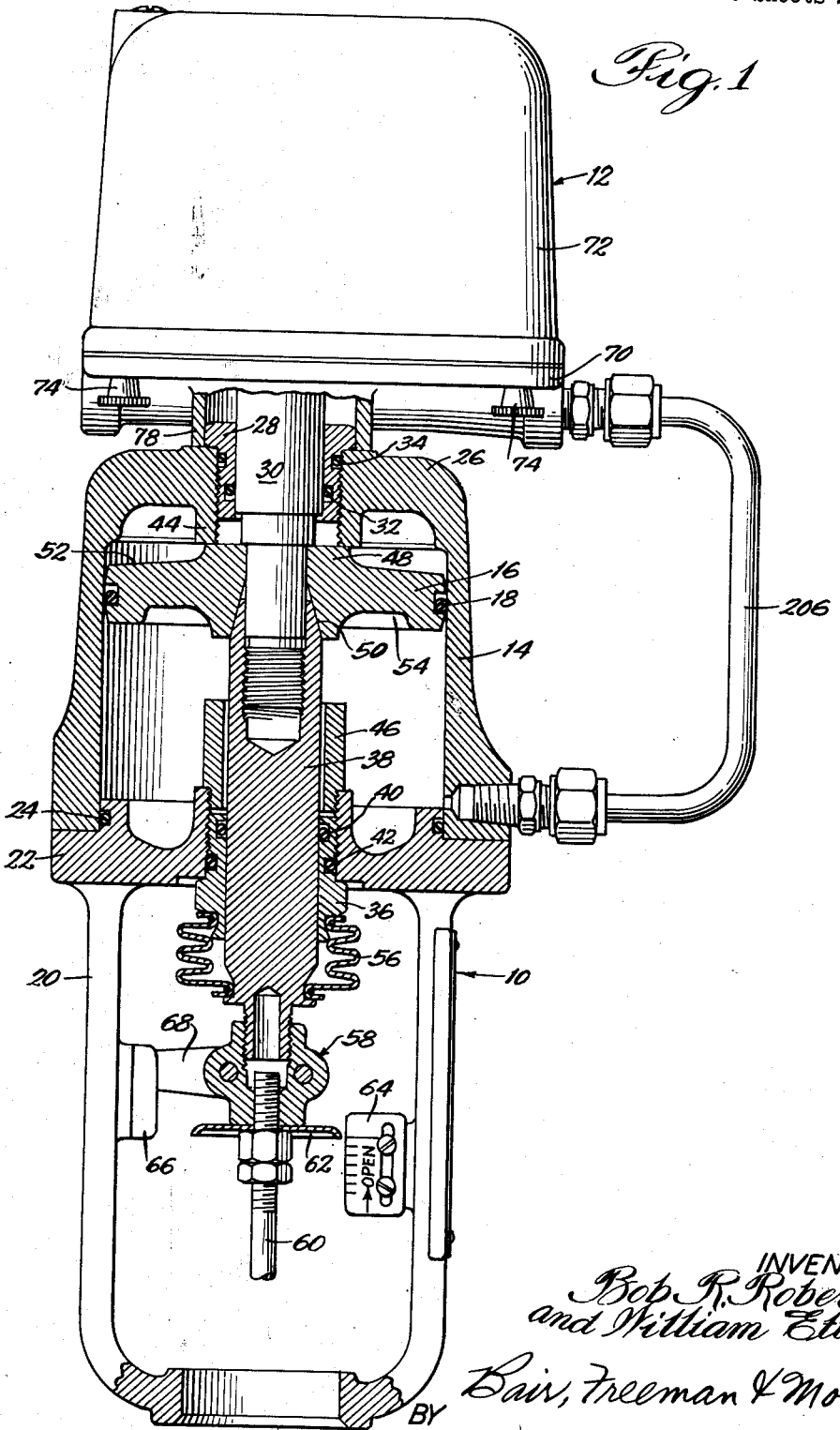
FIGURE 1 is a side elevational view, partly in vertical cross section to show details of construction of the valve actuator means, of a high pressure actuator constructed in accordance with the principles and features of the present invention.

Referring now more particularly to FIGURE 1 of the drawing, we have designated generally at 10 the valve actuator portion of a high pressure actuator constructed in accordance with the present invention. The positioner means thereof is indicated generally at 12.

The actuator portion 10 comprises a generally hollow cylinder 14 having a double-acting piston 16 mounted for axial reciprocation therein. A suitable synthetic rubber sealing ring 18 insures fluid-tight cooperation therebetween. A yoke 20 extends downwardly from the cylinder 14 and provides a lower end wall closure 22 therefor. A sealing ring 24 insures fluid-tight interconnection. A top wall portion 26 of the cylinder 14 provides a threaded aperture to receive a bearing plug 28 for axially slidably supporting a positioner rod 30. Suitable inner and outer sealing rings 32 and 34 insure a fluid-tight interconnection of parts. The yoke closure wall 22 similarly provides a threaded opening receiving a bearing plug 36 for axially slidably supporting a piston rod 38. Inner and outer sealing rings 40 and 42 insure a fluid-tight interconnection of parts.

The cylinder top wall 26 provides an inwardly extending collar portion 44 serving to define an upper annular abutment stop. Similarly, a travel stop collar 46 is threadedly carried by the lower end wall closure 22. In this way, corresponding annular abutment ring portions 48 and 50 at the upper and lower working faces 52 and 54, respectively, of the piston 16, effect cooperative limiting engagement with the stops 44 and 46. The lower end of the positioner rod 30 is threadedly received within the upper end of the piston rod 38. The lower end of the piston rod 38 is secured to the sleeve 36 by means of an axially expansible bellows 56. A bolted clamp type of connector assembly, indicated generally at 58, secures the lower end of the piston rod 38 to the valve stem 60 of a main valve to be controlled. An indicator disc 62 is carried by the clamp assembly 58 for visual cooperation with a calibrated travel indicator 64 carried by the yoke 20. An axial guide 66 is provided by the yoke 20 for cooperation with a guide arm 68 of the clamp assembly 58.

It will be apparent that regulation of the balance of pressures acting upon the upper and lower working faces 52 and 54 of piston 16 will serve to provide control movement of the valve stem 60. The positioner means for providing changes in the pressure balance upon the piston 16 in accordance with a pressure signal, corresponding to changes in the pressure of the fluid being controlled, will now be described.

The operative structure of the positioner 12 is mounted upon a base 70 and enclosed within a cover 72. Mounting screws 74 and a gasket 76 provide a tight seal between the base and cover. The base 70 provides a downwardly extending mounting collar 78 adapted to seat upon the cylinder top wall 26 and to receive therein an upper enlarged portion of the plug 28. Mounting screws 79 permit removable interconnection of the actuator 10 with the positioner 12.

As best seen in FIGURES 2 and 3 of the drawing, a pair of relay assemblies 80 and 82 are provided for controlling the pressure to the top and bottom, respectively, of the piston 16. Each of the relay assemblies is fixedly carried by a mounting and conduit pedestal 84 which extends upwardly from the base 70. The pedestal 84 provides a pair of support posts 86 and 88 for attachment of the bottom end of a bellows unit 90.

An elongated beam member 92, having spaced side arms 94 and 96, freely surrounds the bellows 90 above the pedestal 84. The side arm 96 is split to provide two spaced outrigger flange portions. The ends of the beam 92 terminate in a vertical flange 98 and a horizontal flange 100. A generally U-shaped vertical flexure strip 102 serves to secure the vertical flange 98 to the pedestal 84. A pair of horizontal flexure strips 104 and 106 provide a further flexible interconnection between the beam 92 and the pedestal 84. In this way, the beam 92 is supported upon the pedestal 84 in a manner providing flexure movement in both vertical and horizontal planes. A bellows end flange 108 connects the upper end of the bellows 90 to the side arms of the beam 92. In this way, the bellows 90 serves to further movably interconnect the beam 92 with the pedestal 84.

A vertical flapper 110 is carried by a vertical outrigger arm 112 of the beam 92, and is disposed in cooperative relation with the relay 80. The arm 112 provides a mounting portion at its one end for fixed attachment of one end of the flapper 110, and an abutment portion spaced therefrom at its lower end for engagement of the free end of the vertical flapper 110. Similarly, a horizontal flapper 114 is carried by the split side arm 96 for cooperation with the relay 82.

A bias adjustment spring 116 has an adjustment shaft 118 which is freely movable at its upper end through the beam flange 100, and is prevented from full downward withdrawal therethrough by an E-ring travel stop 120. The lower end of the shaft 118 is secured to the base 70 by means of a lock nut 122, and provides an adjustable travel stop 124 for the lower end of the bias spring 116. A range spring 126 is secured at its upper end by means of a lock 128 to the beam flange 100, and is secured at its lower end to the positioner rod 30 of the valve actuator 10.

The relays 80 and 82 are identical in construction, and the relay 80 will now be described in detail with particular reference being made to FIGURES 4 and 7. Identical parts of the relay 82 will hereinafter be referred to by the same numerals as the parts of relay 80 with an added prime. A main relay body 130 cooperates at its one end with a spacer 132 and an end flange 134 to secure in spaced relation therebetween an operating diaphragm 136 and a sealing diaphragm 138. An air nozzle 140 is threadedly carried by a nozzle stem 142, and a locking spring 144 is interposed therebetween to prevent relative rotation. A head spacer 146 is disposed between the diaphragms 136 and 138 within a nozzle pressure chamber 148 of the body 130. An exhaust port member 150 is disposed within an exhaust chamber 152 of the body 130 at the inner side of the operating diaphragm 136. The exhaust chamber 152 communicates through suitable ports 151 in the body 130 (not shown but illustrated schematically in FIGURE 8) with atmosphere. The nozzle stem 142 and the exhaust port member 150 extend through the respective diaphragms 136 and 138 into telescopically threaded interconnection within the head spacer 146. Bores 153 and 154 of the head spacer 146 and the nozzle stem 142, respectively, provide flow communication between the nozzle pressure chamber 148 and a discharge outlet 141 of the nozzle 140.

The exhaust port member 150 provides a piston 156 axially slidable within a relief chamber 158 having a sleeve 159 and an O-ring 160 for sealing cooperation. Intersecting bores 164 permit flow through the piston 156 from the relief chamber 158, through a relief port defined by a valve seat 166, to the exhaust chamber 152. A valve member 168 provides a head 170 for sealing cooperation with the seat 166. A bore 171 provides axially slidable, sealing support for the valve 168 within the body 130. A second and enlarged head 172 is provided at the outer end of the valve 168 for engagement with a seat 174 of the body 130. A spring 176 serves to bias the valve 168 toward its seated position. An outlet chamber 178 permits pressure flow between the relief chamber 158. A suitable cap 180 provides a mechanical coupling and flow connection with a cylinder top gauge 182. Similarly, a cylinder bottom gauge 184 is provided for the relay 82.

A pair of angled passages 186 communicate the chamber 148 with a threaded bore 188 of the body 130. A restriction plug 190 is received within the bore 188 and provides a valved cleaning assembly 192. Axially inward movement of a pin 193 serves to reciprocate a cleaning pin through the restricted orifice.

As best seen in FIGURES 2 and 6, a cylinder fitting 194 is communicated through a conduit 196 with the cylinder bottom gauge 184. An instrument fitting 198 communicates through a conduit 200 with an instrument gauge 202. As seen in FIGURE 3, a vent fitting 204 communicates the interior of the mounting collar 78 of the positioner base 70 with atmosphere. A pressure pipe 206 provides flow between a fitting 208, communicating with the cylinder 14 below the piston 16, and the cylinder fitting 194 (see FIGURE 4). The cylinder fitting 194, in turn, communicates through a suitable flow passage integrally formed within the pedestal 84, with the output chamber 178' of the relay 82 (illustrated schematically with reference to pipe 206 and chamber 178' in FIGURE 8). Passages 210 and 212 of the positioner base 70 and the cylinder top wall 26, respectively, serve to communicate the top end of the cylinder 14 above the piston 16 with the pedestal 84, and through a passage 214 of the body 130 with the outlet chamber 178 of the relay 80. Suitable passages 216 and 218 in the body 130, not shown in detail but indicated in FIGURE 7, communicate the restriction bore 188 and the valve bore 171, respectively, with an air supply fitting 220, as schematically illustrated in FIGURE 8.

*Practical Operation*

Referring now to FIGURE 8 of the drawing, the principles of operation of the actuator of the present invention will be described. For purposes of illustration, the actuator 10 and its positioner 12 are shown in operatively mounted relation upon a main valve unit 222. It will be understood, however, that the features of the present invention may be readily applied to any similar positioning action of a double-acting cylinder, such as for the adjusting movement of rolls, louvers, and the like. It will be assumed for the practical valve application herein to be described that the pressure of the fluid in the main line being controlled by the valve unit 222 will be transmitted by a suitable pressure signal from a controller instrument connected in the line, through the instrument fitting 198 (FIGURE 2), to the bellows 90 of the positioner 12, as schematically shown in FIGURE 8.

In order to describe the operation of the valve actuator, it will first be assumed that the pressure of the fluid being controlled has increased above the set point, that is the position to which the control-point-setting mechanism is set for maintaining the controlled variable at a predetermined value. The bellows 90 will receive an increased pressure signal and will expand to move the beam 92. The beam 92 will pivot clockwise around the relatively fixed pivot provided by the cooperative interaction of the vertical flexure strip 102 and the horizontal flexure strips 104 and 106. This type of beam pivotal action in response to a pressure signal is known in the art, and reference may be made to such prior patents as Nos. 2,298,112 and 2,789,543. As the beam 92 pivots around its fixed point, it simultaneously uncovers the nozzle of relay 82 and covers the nozzle of relay 80. This will cause the nozzle pressure to increase within relay 80 due to the restriction created by the beam over its nozzle 140 and to decrease within the relay 82.

It will be understood that if the pressure of the fluid being controlled decreases below the set point the reverse pivotal action of the beam 92 will take place. A decrease in the pressure in the bellows 90 as indicated by the instrument signal causes the beam 92 to move down, restricting the nozzle of relay 82 and uncovering the nozzle of relay 80.

The valve positioner 12 includes two identical air relays 80 and 82 which feed air through their respective connecting lines 210—212 and 206 to the top and bottom sides 52 and 54, respectively, of the air cylinder piston 16. These relays are supplied with 90 to 125 p.s.i. air pressure from the supply inlet 220 and through the relay bodies 130 and 130' to the respective valve chambers 171 and 171' thereof. The supply air pressure is also conducted to a very small 0.009 inch diameter restricting orifice of the plugs 190 and 190'. This pressure is reduced to approximately 2 p.s.i. as it passes through the restricting orifices into the top diaphragm chambers 148 and 148'. The pressure discharges to atmosphere through the open 0.028 inch diameter outlets 141 and 141' of the nozzles.

The two relays 80 and 82 are located so that the two nozzles 140 and 140' thereof are spaced about 0.001 inch, or slightly less, from their respective flappers 110 and 114. With the flappers at this spacing, the pressure between the restricting orifice and the nozzle outlet is approximately 25 p.s.i. Since these relays are of a three-to-one ratio design, the outlet pressure from them to the lines 206 and 210—212 will be 75 p.s.i. with the nozzle pressure at 25 p.s.i. This ratio is maintained because the top operating area of the diaphragm 136 is three times the bottom operating area of the piston 156.

It will be apparent that movement of the flappers 110 and 114 toward their respective nozzles will result in an increase of the nozzle pressure within the chambers 148 and 148' of the corresponding relays 80 and 82. This pressure increase will effect a movement of the diaphragm 136 and piston 156 inwardly, which in turn opens the valve 172 and allows the supply pressure within the chamber 171 to pass into the outlet chamber 178 and therefrom through the corresponding lines 206 or 210—212 to the cylinder 14. Since the nozzle 140 is fixedly secured to the diaphragm 136 and the piston 156, it will also move inwardly during this pressure response action, and thereby displace the nozzle outlet 141 away from its flapper.

Movement of the flappers away from their corresponding nozzles serves to decrease the nozzle pressure within the chamber 148 and thereby cause a movement of the diaphragm 146 and piston 156 outwardly. This action effects a closing of the valve 172 and an opening of the valve 170. In this way, outlet pressure is allowed to bleed out from the cylinder 14, through the relay outlet chambers 178 and relief chamber 158, to the exhaust chamber 152 and atmosphere. During such action, the nozzle outlet 141 moves toward its corresponding flapper.

An increase of the pressure within the bellows 90 will cause a downward movement of the beam 92 (or clockwise rotation as seen in FIGURE 8), thereby causing the flapper 110 to move toward the nozzle 140 of relay 80, while causing the flapper 114 to move away from its nozzle 140' of the relay 82. Such movement results in an increase in the outlet pressure of the relay 80, and a corresponding increase in the pressure through line 210—212 to the upper side 52 of the cylinder piston 16. At the same time, a decrease in the outlet pressure occurs on the relay 82 and through the line 206 to the lower side 54 of the cylinder piston 16. In this way, the piston 16 will be caused to move downwardly within the cylinder 14.

The range spring 126 serves to oppose the force created by an increasing pressure within the bellows 90. In this way, an increase in bellows pressure will produce a proportional downward movement of the piston 16, whereas a decrease in the bellows pressure will produce an upward movement of the piston.

A direct acting actuator may be defined as one in which an increasing instrument signal will cause the actuator piston to move downwardly. In order to reverse this action and make the piston move upwardly with an increasing instrument signal, the mounting of the bellows 90 relative to the beam 92 may be reversed, as indicated in FIGURE 9. When reversing the action of the actuator, it is necessary to readjust the "zero" adjustment spring 116 after inverting the bellows 90. In order to do this for a standard 3 to 15 p.s.i. operating range, it is necessary to apply a pressure of 3 p.s.i. to the bellows 90 and adjust the spring 116 until the piston 16 is at the lowest part of its stroke against the stop 46. The piston 16 will then be at the bottom of its stroke with a 3 p.s.i. signal and at the top of its stroke with a 15 p.s.i. signal. For a direct acting actuator, the spring 116 is normally adjusted so that the piston 16 is at the uppermost part of its stroke against the stop 44 at an instrument signal of 3 p.s.i.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A pneumatically-operated mechanism comprising, in combination, a push-pull positioner and a double-acting air cylinder actuator, said actuator including an air cylinder having a movable element therein adapted to be coupled to a control element to be moved, said movable element defining a first chamber and a second chamber in said air cylinder, said positioner comprising a base, a pair of air relays fixed to said base, an elongated beam having a pair of arms pivoted for alternative movement toward and away from said fixed air relays, and pneumatic pressure responsive means operative to pivot said beam in response to an instrument signal, said air relays each comprising a body, an inlet in said body adapted to communicate with a source of control air, an outlet in said body, valve means communicating said inlet and said outlet, an open nozzle movably supported in said body and adapted to be closed by corresponding flappers carried by said beam, and movable control means for actuating said valve means in response to closure of said nozzle to communicate said inlet and said outlet, said nozzle being operatively connected to said movable control means, whereby upon pivotal movement of said beam in one direction or the other, said flappers will move in correspondingly opposed manner toward alternative closure or exposure of said air relay nozzles, thereby to provide push-pull cooperation between said air relays and said beam, said beam being mechanically coupled by range spring means to said movable element, one of said air relays providing a controlled air flow through the outlet thereof to one of said chambers in the cylinder and the other of said air relays providing a controlled air flow through the outlet thereof to the other of said chambers in the cylinder, each of said air relays being operative in response to nozzle closure to transmit control air pressure to the corresponding chamber of said movable element, thereby to unbalance said movable element and effect movement thereof for performing a corresponding control element action.

2. A pneumatically-operated mechanism comprising, in combination, a push-pull positioner and a double-acting air cylinder actuator, said actuator including an air cylinder having a movable element therein adapted to be coupled to a control element to be moved, said movable element defining a first chamber and a second chamber in said air cylinder, said positioner comprising a base, a pair of air relays fixed to said base, an elongated beam having a pair of arms pivoted for alternative movement toward and away from said fixed air relays, pneumatic pressure responsive means operative to pivot said beam and range spring means mechanically coupling said beam to said movable element, said air relays each comprising a body having an inlet adapted to be connected to a source of control air and an outlet, valve structure in said body for controlling air flow from said inlet to said outlet, diaphragm means in said body for actuating said valve structure, and an open nozzle operatively connected to said diaphragm means and movable therewith adapted to be closed by corresponding flappers carried by said arms of said beam to move said diaphragm means, the outlet of one of said air relays being connected to one of said chambers in the cylinder and the outlet of the other of said air relays being connected to the other of said chambers in the cylinder, whereby upon pivotal movement of said beam in one direction or the other said flappers will move in correspondingly opposed manner toward alternative closure or exposure of said air relay nozzles, thereby to provide push-pull cooperation between said air relays and said beam, each of said air relays being operative in response to nozzle closure to transmit control air to the corresponding chamber of said movable element, thereby to unbalance said movable element and effect movement thereof for performing a corresponding control element action.

3. A pneumatically-operated piston-type valve actuator comprising, in combination, a push-pull positioner and a double-acting air cylinder actuator, said actuator providing an air cylinder having a movable piston therein carrying a piston rod adapted to have its one end coupled to a valve, said positioner comprising an elongated beam having a first arm and a second arm connected generally at a right angle to one another, said beam being pivoted for alternative movement toward and away from a pair of fixed air relays, pneumatic pressure responsive means operative to pivot said beam, said air relays each including a body having inlet means adapted to communicate with a source of air under pressure and outlet means, valve means in said body for connecting said inlet means to said outlet means, diaphragm means for actuating said valve means and an open nozzle operatively connected to said diaphragm means and movable therewith adapted to be closed by corresponding flappers carried by said arms of said beam, whereby upon pivotal movement of said beam in one direction or the other, said flappers will move in correspondingly opposed manner toward alternative closure or exposure of said air relay nozzles, thereby to provide push-pull cooperation between said air relays and said beam, one of said air relays providing a controlled air flow through the outlet thereof to the top of said piston and the other providing a controlled air flow through the outlet thereof to the bottom thereof, each of said air relays being operative in response to nozzle closure to transmit increased air pressure to a respective opposed side of said piston, thereby to unbalance said piston and effect movement thereof for performing a corresponding valve action.

References Cited in the file of this patent

UNITED STATES PATENTS

| | | |
|---|---|---|
| 2,558,506 | Annin | June 26, 1951 |
| 2,830,785 | Buri | Apr. 15, 1958 |
| 2,867,233 | Adelson | Jan. 6, 1959 |
| 2,879,781 | Gimson | Mar. 31, 1959 |
| 2,880,705 | Schneider | Apr. 7, 1959 |
| 2,911,991 | Pearl | Nov. 10, 1959 |
| 2,942,581 | Gaffney | June 28, 1960 |
| 2,944,526 | Jarvis | July 12, 1960 |

FOREIGN PATENTS

| | | |
|---|---|---|
| 333,301 | Switzerland | Oct. 15, 1958 |